June 4, 1963  J. B. CANNON, JR  3,092,687
RECONNAISSANCE SYSTEM WITH A STABILIZED RECORDING MAGAZINE
Filed Aug. 4, 1960                                                2 Sheets-Sheet 1

INVENTOR
JOHN B. CANNON JR.

BY Harmon & Kurz
ATTORNEY

June 4, 1963   J. B. CANNON, JR   3,092,687
RECONNAISSANCE SYSTEM WITH A STABILIZED RECORDING MAGAZINE
Filed Aug. 4, 1960   2 Sheets-Sheet 2

INVENTOR
JOHN B. CANNON JR.

BY  Harmon + Kurz

ATTORNEY

United States Patent Office 3,092,687
Patented June 4, 1963

3,092,687
RECONNAISSANCE SYSTEM WITH A STABILIZED
RECORDING MAGAZINE
John B. Cannon, Jr., 1856 N. Oak Lane,
State College, Pa.
Filed Aug. 4, 1960, Ser. No. 47,429
3 Claims. (Cl. 178—6.7)

This invention relates to optical reconnaissance systems generally and more particularly to an improved reconnaissance system with a stabilized recording magazine.

When cameras or mechanical optical scanning devices are used in conjunction with a reconnaissance vehicle, it becomes necessary ot provide mounting means capable of stabilizing the camera or scanning device relative to the axes of the vehicle. This need for stabilization is particularly important when the camera or scanning device is used for aerial reconnaissance. These stabilized mounting means are usually gyro-controlled, and those presently in use include complex stabilizing mechanisms requiring a large allocation of space.

The aerial camera mounts presently in use usually stabilize a camera about the three axes of aircraft rotation; namely, roll, pitch and yaw. This permits relatively long film exposure without excessive blurring of the reproduction obtained.

In the mechanical optical scanning systems now used in aerial reconnaissance, the type of external stabilization employed for aerial cameras is often utilized. It is not necessary, however, to provide the accuracy of stabilization or the precise film speed control for an aerial scanning system which is required for an aerial camera system, for although poor stabilization and film speed control will cause distortion of the reproductions obtained through aerial photography, these factors do not greatly affect the reproductions obtained from an aerial scanning system. When aerial scanning systems are utilized, the exposure time for each portion of the target area being scanned is so short, that even violet motions of the reconnaissance aircraft will not cause appreciable blurring of the reproduction obtained. For this reason, stabilization of an optical scanning system relative to only the roll axis of a reconnaissance aircraft is often sufficient. Stabilization relative to the aircraft roll axis may be obtained by mounting the entire scanning unit in bearings on a longitudinal axis and gyro stabilizing the unit about this axis by the mechanical action of integrally mounted gyros, using the roll take-off potentiometer of a conventional vertical gyro to vary the positioning of an intensity modulated cathode ray tube trace used to record the scanned video signal on slowly moving film, or using a gyro controlled device to control the angular position around the scanner of a pulse pick-up unit so that the pulse always occurs when the scanner is at a predetermined angle with respect to true vertical. Instead of using a mechanical means to position this pulse pick-up unit, it is also possible to rigidly mount the unit on the scanner frame work and to pass the received pulse through a gyro controlled variable delay device, the output of which always occurs when the scanner is at a predetermined angle with respect to true vertical. All of these stabilizing systems include intricate electrical or mechanical mechanisms which either require a large allocation of space, require great electrical precision, or are not particularly well adapted to a crater lamp type recorder such as described herein.

The primary object of this invention is to provide an improved optical reconnaissance system having a simplified stabilizing mechanism of reduced size.

Another object of this invention is to provide an optical reconnaissance system having a stabilized recording magazine.

A further object of this invention is to provide an optical reconnaissance system having a recording magazine which is stabilized relative to the roll axis of a vehicle.

A still further object of this invention is to provide an optical reconnaissance system having a recording magazine which is stabilized relative to a target surface along the roll axis of a vehicle through 60 degrees of roll.

With the foregoing and other objects in view, the invention resides in the folowing specification and appended claims, the details of construction of which are illustrated in the accompanying drawings in which:

Figure 1:
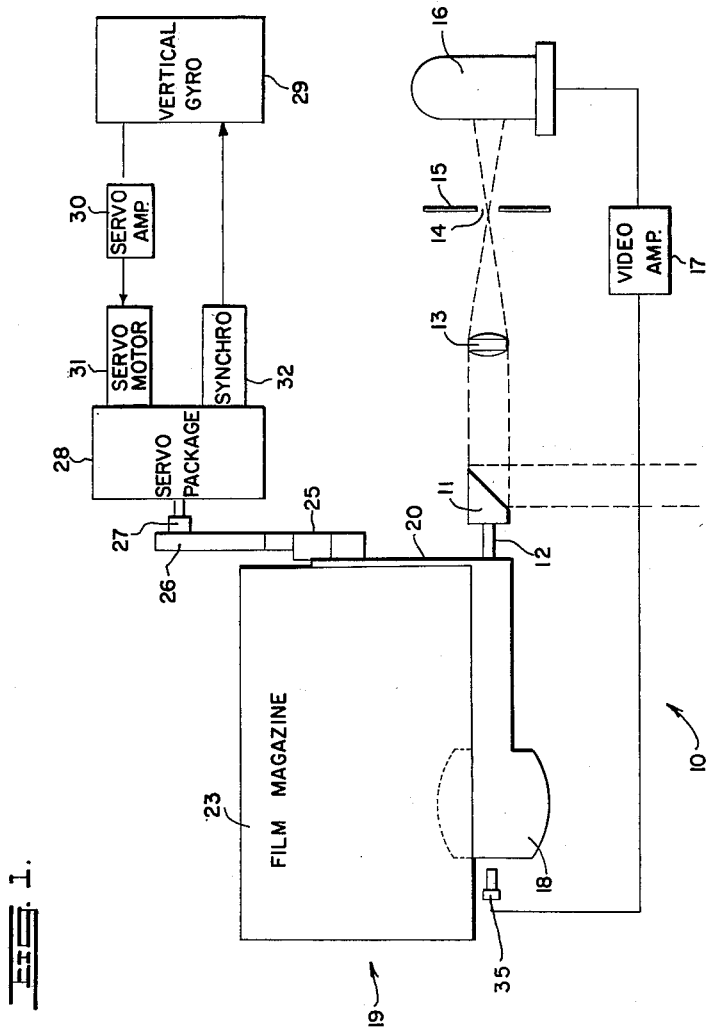
FIGURE 1 is a diagrammatic lay-out of one form of reconnaissance system incorporating the principles of the present invention.

Basically, the optical reconnaissance system of the present invention provides for the stabilization of a recording magazine only relative to the roll axis of a vehicle by gyroscopic or other suitable means. By stabilizing only the recording magazine of a reconnaissance system, it is possible to use a simplified stabilizing mechanism which requires a minimum space allocation. In FIGURE 1, the optical reconnaissance system of the present invention indicated generally at 10, is illustrated in conjunction with an optical scanning unit utilized in aerial reconnaissance. The stabilization system illustrated by FIGURE 1 is particularly adaptable for use with mechanical optical scanning devices utilized in aerial reconnaissance, but it need not necessarily be exclusively limited to use with units of this type. The reconnaissance system 10 includes a rotatable scanning mirror 11 which is mounted upon a shaft 12. Shaft 12 is driven by any suitable driving means (not shown) to cause the scanning mirror 11 to rotate and receive radiation along an axis perpendicular to the shaft 12. The scanning mirror 11 may include only a single scanning face, or it may have multiple scanning faces to provide a number of target scans for each revolution of the shaft 12. The radiation received by the scanning mirror 11 is reflected along an optical axis which is essentially parallel to the rotational axis of the shaft 12 to an objective lens 13 which focuses the radiation on a pin hole 14 in a field stop 15. The radiation which is allowed to pass through the pin hole 14 falls upon a detector 16 which is sensitive to radiation in any desired portion of the electro magnetic spectrum. Detector 16 converts the radiant energy to electrical energy, and an output signal from the detector 16 is passed through a video amplifier 17 to a glow modulator lamp 35 within a housing 18. Housing 18 forms the bottom wall of a platform unit 19 which includes an end wall 20 extending upwardly from the bottom wall 18. A film magazine or other suitable recording magazine 23 is mounted upon the platform 19 and is held securely thereby.

Secured to the end wall 20 of the platform 19 is a ring gear 25. Ring gear 25 meshes with a sector gear 26 which is mounted upon the shaft 27 of a servo package 28. The servo package 28 is controlled through the medium of a conventional vertical gyro 29 through a synchro unit 32 and a servo amplifier 30 which derives a servo motor 31. The synchro unit 32 is geared at a one to one ratio with the film magazine 23 and the position of the synchro unit is compared to the synchro take-off (not shown) of the vertical gyro 29. If the film magazine 23 moves from a vertical attitude, the synchro unit 32 will send a deviation signal for comparison to the synchro take-off of the vertical gyro 29, and the resulting error signal passes through the servo amplifier 30 to control the servo motor 31. The servo motor 31 therefore tends to maintain the vertical attitude of the film magazine 23. When the system is mounted in a reconnaissance aircraft, the vertical gyro 29 may be a flight instrument of the aircraft.

Figure 2:
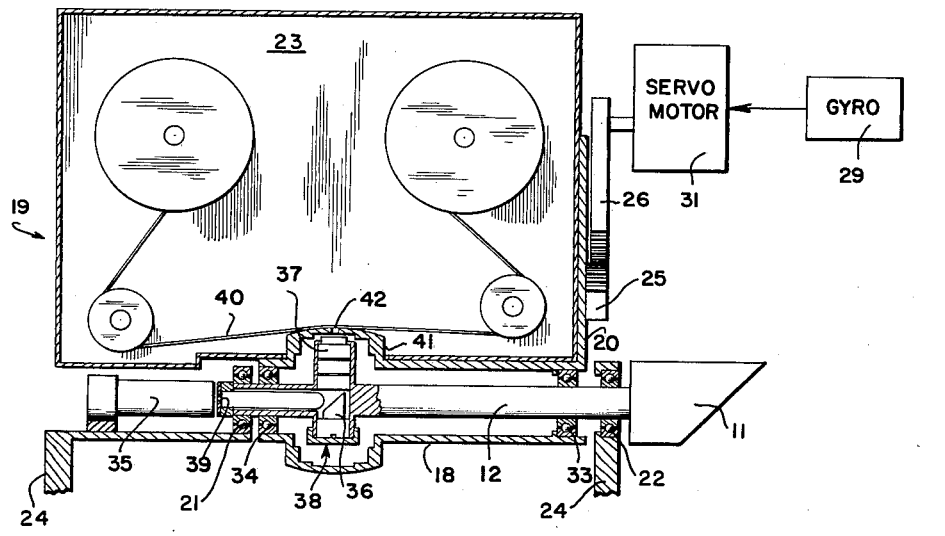
FIGURE 2 is a sectional view in side elevation illustrating the optical systems and film magazine of FIGURE 1.

FIGURE 2 shows the scanning shaft and optics assembly contained within the housing 18. The housing 18 is mounted for rotation about the scanner shaft 12 by means of shaft bearings 33 and 34. This bearing mount makes it possible for the platform 19 carrying the film magazine 23 to be moved about the scanning shaft 12 by means of the servo motor 31. The housing 18 is supported by bearing members 21 and 22 which are mounted upon rigid brackets 24. Mounted upon the scanning shaft 12 within the housing 18 is an optical system 38 which includes the glow modulator lamp 35, a reflecting mirror 36, and an objective lens 37. It is not necessary to the invention that the optical system 38 be mounted upon the scanning shaft 12, but by so doing, optimum synchronization is provided between the optical system 38 and the rotatable scanning mirror 11. The signal from the video amplifier 17 of FIGURE 1 is directed to the glow modulator lamp 35 and is used to control the brightness of the glow modulator lamp. Light radiation from the glow modulator lamp passes through a pin hole 39 to the surface of the reflecting mirror 36. Reflecting mirror 36 is a 45 degree mirror and acts to change the direction of the light energy from the modulator lamp 35 and cause it to pass through the objective lens 37 to a film strip 40. A barrel shaped film former 41 is provided in the housing 18, and a slot 42 extends transversely across the top portion of the film former 41. The film strip 40 is curved around the barrel shaped film former so that the light energy from the objective lens 37 will pass through the slot 42 and sweep across the film strip 40 upon each rotation of the scanner mirror 11. The film strip 40 is curved around the barrel shaped film former 41 at the point of exposure so that the film will be at the exact focal point of the objective lens 37 at all points along the line of scan. This curvature of the film strip 40 introduces a scale factor distortion into the reproduction obtained thereon, and if desirable, this distortion may be substantially eliminated by utilizing an objective lens having great depth of focus or a field flattening device, so that the film strip may be retained in a flat configuration.

Figure 3:
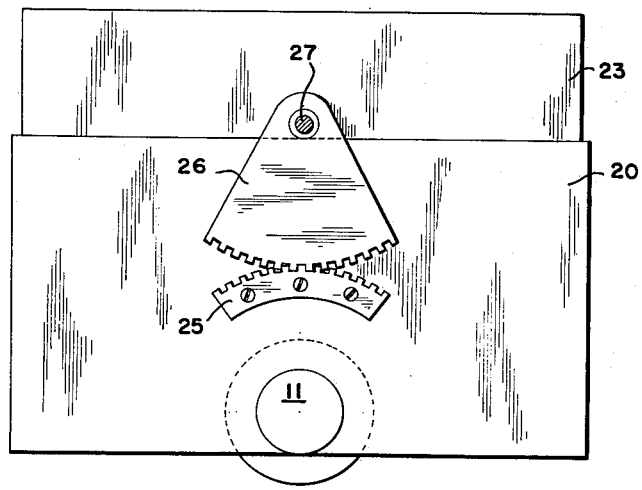
FIGURE 3 is a view in front elevation of the film magazine of FIGURE 2.

In the operation of the invention as shown by FIGURES 1 through 3, the reconnaissance system 10 is mounted so that the rotational axis of the scanner shaft 12 is along the roll axis of an aircraft or other carrying vehicle. The rotatable scanning mirror 11 receives rays of radiation along an axis perpendicular to the scanning shaft 12, and an electrical signal generated from this radiation is used to control the brightness of the glow modulator lamp 35. The light from the glow modulator lamp 35 passes through the pin hole 39, and after being reflected by the 45 degree reflecting mirror 36, is focused upon the film strip 40 by the objective lens 37. Thus, as the scanning mirror 11 scans a target surface, the objective lens 37 scans a small spot of light across the film strip 40, 180 degrees displaced from the target surface. The spot of light which scans the film strip 40 is synchronized with the scan of the target surface by the scanning mirror 11 through the action of the scanning shaft 12 which mounts both the scanning mirror 11 and the optical system 38.

As the reconnaissance vehicle moves about its roll axis, the gyro 29 causes the servo motor 31 to move the supporting platform 19 and film magazine 23 about the rotational axis of the scanning shaft 12 through the action of the gears 25 and 26. The gears 25 and 26 may be constructed so that a 30 degree rotation of the film magazine on either side of the center line is provided. As the rotational axis of the scanning shaft 12 is located along the roll axis of the reconnaissance vehicle, the film magazine 23 is constantly stabilized to maintain a vertical position which is 180 degrees from the target surface being scanned.

It will be readily apparent to those skilled in the art that the present invention provides a novel and improved optical reconnaissance system which includes an efficient stabilization mechanism of reduced size. The arrangement and types of components utilized within this invention may be subject to numerous modifications well within the purview of this inventor who intends only to be limited to a broad interpretation of this specification and appended claims.

I claim:

1. An optical reconnaissance system for reconnaissance vehicles, comprising rotatable, non-stabilized, scanning means mounted upon a rotatable scanning shaft, said shaft being attached to said vehicle and extending along an axis substantially parallel to the roll axis of said vehicle, said scanning means receiving and reflecting the radiant energy from a target while moving angularly thereto with said vehicle, an electro-optical system arranged along a common optical axis with said scanning means, said electro-optical system receiving and converting the reflected radiant energy from said scanning means into an electrical output signal, a glow modulator lamp, the intensity of which is controlled by the output signal from said electro-optical system, an optical system mounted upon said scanning shaft and rotatable therewith to receive and redirect a sweep of radiation from said glow modulator lamp upon each rotation of said scanning means, a platform mounted for limited movement about said scanning shaft, said platform including a transversely slotted, barrel shaped film former, a recording magazine containing a recording medium mounted upon said platform, said recording medium passing over said film former to receive redirected radiation from said optical system through said transverse slot, said film former being shaped to maintain said recording medium at a fixed distance from said optical system for all positions within the range of movement of the recording magazine about said scanning shaft, and gyroscopically controlled servo motor means mounted to move said platform about said scanning shaft to maintain a stabilized relationship between said recording magazine and said target surface.

2. The optical reconnaissance system of claim 1 in which said recording magazine is capable of movement through an angle of 60 degrees about the roll axis of said reconnaissance vehicle.

3. An optical reconnaissance system for angularly moving reconnaissance vehicles comprising rotatable, non-stabilized scanning means mounted upon a scanning shaft attached to said vehicle and which extends along an axis parallel to the roll axis of said reconnaissance vehicle, said scanning means receiving and reflecting the radiant enregy from a target surface while moving angularly with said vehicle, a platform mounted for limited movement about said scanning shaft, a recording magazine containing a recording medium mounted upon said platform, external stabilizing means for moving said platform about said scanning shaft to maintain a stabilized relationship between said recording magazine and said target surface, an electro-optical system arranged along a common optical axis with said scanning means, said electro-optical system receiving and converting the reflected radian energy from said scanning means into an electrical output signal, light modulating means, the intensity of which is controlled by the output signal from said electro-opitical system, said light modulating means being electrically connected to receive the output signal from said electro-optical system, and an optical system arranged to receive the radiation from said light modulating means, said optical system directing the radiation from said light modulating means onto said recording medium.

References Cited in the file of this patent
UNITED STATES PATENTS

| | | |
|---|---|---|
| 1,709,314 | Henderson | Apr. 16, 1929 |
| 2,394,649 | Young | Feb. 12, 1946 |
| 2,859,653 | Blackstone et al. | Nov. 11, 1958 |
| 2,945,414 | Blackstone | July 19, 1960 |